United States Patent [19]

Umehara

[11] Patent Number: 4,492,287
[45] Date of Patent: Jan. 8, 1985

[54] APPARATUS FOR UTILIZING THE IMPACT FORCE OF BODIES FALLING UNDER GRAVITY

[76] Inventor: Masayu Umehara, 8, Kita 5-chome, Takayasu-cho, Yao-shi, Osaka, Japan

[21] Appl. No.: 396,475

[22] Filed: Jul. 8, 1982

[30] Foreign Application Priority Data

Aug. 6, 1981 [JP] Japan .............................. 56-124873

[51] Int. Cl.³ ................................................ F03G 3/00
[52] U.S. Cl. ........................................ 185/33; 74/130
[58] Field of Search .................... 185/4, 6, 7, 27, 32, 185/33; 74/130, 131, 132; 173/98, 101

[56] References Cited

U.S. PATENT DOCUMENTS

| | | | |
|---|---|---|---|
| 566,198 | 8/1896 | Livoni | 74/131 |
| 1,022,586 | 4/1912 | Haskins | 173/98 |
| 1,190,131 | 7/1916 | Dunham | 74/131 |
| 1,597,025 | 8/1926 | Eger | 74/130 |
| 2,340,155 | 1/1944 | Tanner | 185/33 X |
| 4,201,059 | 5/1980 | Feder | 185/33 X |

*Primary Examiner*—Allan D. Herrmann
*Attorney, Agent, or Firm*—Wenderoth, Lind & Ponack

[57] ABSTRACT

The impact force successively produced by a plurality of steel balls falling plumb down is utilized to rotate a shaft. The steel balls are allowed to circulate through a circuit which is in the form of an obtuse-angle triangle with one of the three sides erected vertically. When the steel ball falls plumb down through the vertical passage, it strikes against the head of a rod and pushes down the rod, the lower half of which is formed into a rack meshing with a pinion.

5 Claims, 4 Drawing Figures

APPARATUS FOR UTILIZING THE IMPACT FORCE OF BODIES FALLING UNDER GRAVITY

BACKGROUND OF THE INVENTION

1. Field of the Invention

The present invention relates to an apparatus for utilizing the impact force of a plurality of falling bodies.

2. Description of the Prior Art

No apparatus for utilizing the impact force produced by a plurality of bodies such as steel balls falling plumb down under gravity has been developed yet, although such an impact force is of immense magnitude.

SUMMARY OF THE INVENTION

It is an object of the present invention to provide an apparatus for taking the impact force from a plurality of bodies in a condition of free fall and allowing this impact force to cause the rotation of a shaft.

With this object in view and as will become apparent from the following detailed description, the present invention will be more clearly understood in connection with the accompanying drawings.

DETAILED DESCRIPTION OF THE PREFERRED EMBODIMENT

Figure 1:
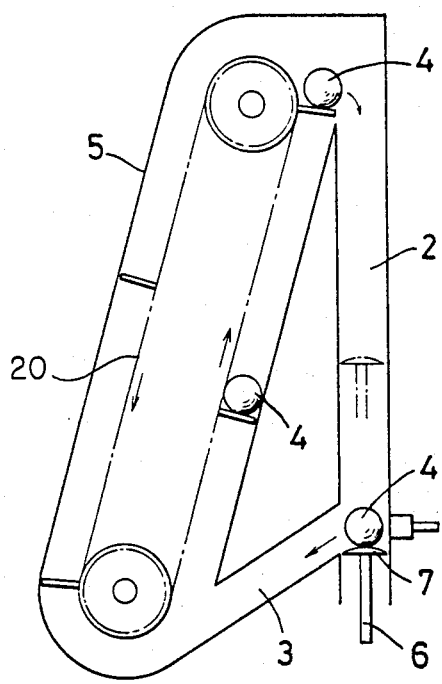
FIG. 1 is a front view of a part of the apparatus according to the present invention.
Figure 2:
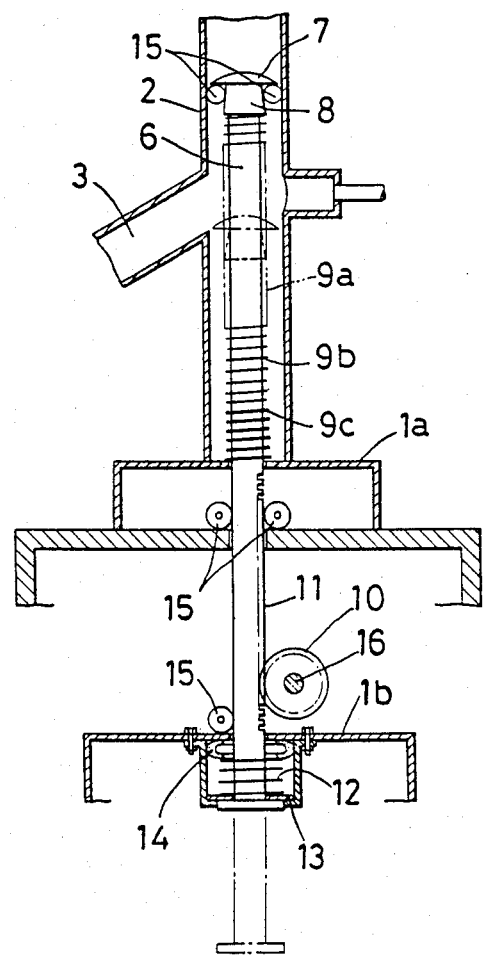
FIG. 2 is a front view in section of the remaining part thereof.

Referring now to FIGS. 1 and 2, an apparatus in accordance with the present invention includes an upper base 1a, a lower base 1b provided beneath the upper base 1a, a main pipe 2 vertically erected on the upper base 1a, and an inclined pipe 3 branched from the middle portion of the main pipe 2. The inclined pipe 3 allows a steel ball 4, which has fallen plumb down through the main pipe 2, to turn aside from the main pipe 2 so as to make way for the next steel ball 4. The lower end of the inclined pipe 3 and the upper end of the main pipe 2 are interconnected by a communicating passage 5, in which a conveyor 20 for carrying the steel balls 4 from the lower end of the inclined pipe 3 to the upper end of the main pipe 2 is disposed.

A rod 6 with a round head 7 is disposed in the main pipe 2 coaxially therewith. A collar 8 fits on the upper end portion of the rod 6 so as to abut on the under surface of the round head 7. The other end of the rod 6 extends through and beyond the upper base 1a and the lower base 1b. Three springs 9a, 9b and 9c, which are connected in series and fitting over the rod 6, engage at opposite ends against the upper surface of the upper base 1a and the lower end of the collar 8 to bias the rod 6 upwardly. The middle spring 9b has a larger spring constant than the upper spring 9a, and the lower spring 8c has a still larger spring constant than the middle spring 9b. A pinion 10 provided in the space left between the upper base 1a and the lower base 1b meshes with a rack 11 formed in the lower half of the rod 6. A spring 12 fitting over the lower end portion of the rod 6 engages at opposite ends against an elastic plate 13 provided on the lower end of the rod 6 and an elastic ring 14 provided on the under surface of the lower base 1b so that the upward movement of the rod 6 is cushioned and limited by the spring 12 and the elastic ring 14.

The rod 6 is allowed to axially move up and down with minimized friction because of a plurality of ball bearings 15. The elastic ring 14 has a larger thickness toward its center than its outer sides.

Figure 3:
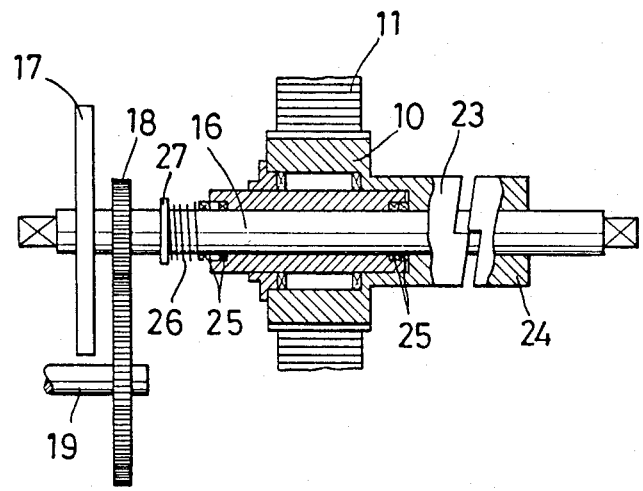
FIG. 3 is an enlarged side view of a portion of the part shown in FIG. 2.

Referring now to FIG. 3, the apparatus in accordance with the present invention is characterized by the use of a clutch mechanism by which the rotation can be transmitted from the pinion 10 to a shaft 16 and the transmission can be released when the force exerted by the rack 11 on the pinion 10 is reversed. The fluctuation in the speed of revolution of the shaft 16 is moderated by the inertia of a flywheel 17 secured to one end of the shaft 16. A gear 18 for transmitting the rotation to another shaft 19 is provided in the proximity of the flywheel 17. The clutch mechanism includes driving and driven clutch members 23 and 24. The driving clutch member 23 is formed integrally with the pinion 10 for rotation therewith and for limited axial movement along the shaft 16 by the provision of a plurality of bearings 25. The driven clutch member 24 is firmly secured to the shaft 16. The clutch members 23 and 24 are normally urged toward engagement with each other by a spring 26 positioned about the shaft 16 with its one end in abutment with a collar 27 provided in the proximity of the gear 18 and with its other end seated in abutment with one of the bearings 25. The spring 26, therefore, constantly urges the driving clutch member 23 into axial but yieldable driving engagement with the driven clutch member 24.

From the foregoing, it will be recognized that, upon the operation of the conveyor in the communicating passage 5, the steel balls 4 begin to be carried from the lower end of the inclined pipe 3 to the upper end of the main pipe 2. When the first steel ball 4 reaches the upper end of the main pipe 2, it is allowed to fall plumb down through the main pipe 2. Then the steel ball 4 strikes against the round head 7 of the rod 6 and pushes down the rod 6. Then the upper spring 9a, which has the smallest spring constant, is completely compressed, while the impact force produced by the steel ball 4 is sustained by the middle and lower springs 9b and 9c. The pinion 10 rotates as the rod 6 is pushed down. The rotation of the pinion 10 will be transmitted from the driving clutch member 23 to the driven clutch member 24 with which it is engaged. Then the shaft 16 is rotated.

When the rod 6 reaches the lower end of its stroke, the rod 6 together with the steel ball 4 is pushed up by the resiliency of the springs 9a, 9b and 9c. When the steel ball 4 reaches the upper end of the inclined pipe 3, it is allowed to turn aside from the main pipe 2 into the inclined pipe 3. Thereafter, the steel ball 5 is carried to the upper end of the main pipe 2 again. On the other hand, the engaging surfaces of the driving clutch member 23 and the driven clutch member 24 are conveniently shaped so as to permit them to ride over each other when the pinion 10 is rotated in a direction reverse from the direction in which it is rotated during the downward movement of the rod 6. When this reverse rotation causes the clutch engaging surfaces to ride over each other, the drive from the rack 11 to the shaft 16 is disconnected and, consequently, the shaft is allowed to continue rotating in the same direction.

Figure 4:
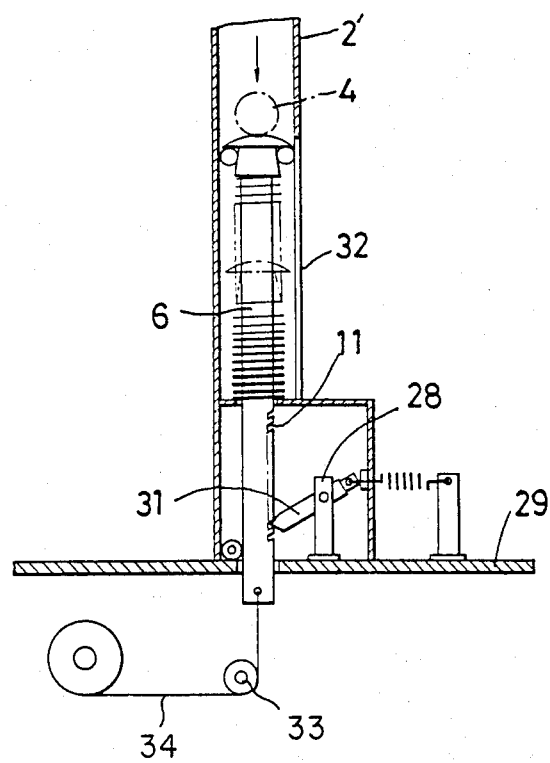
FIG. 4 is a front view of a testing machine to be used for the apparatus according to the present invention.

Referring now to FIG. 4, a testing machine for measuring the impact force of the steel ball 4 and the spring constants of the springs 9a, 9b and 9c includes an arm 28, which is vertically secured to the base plate 29 of the testing machine and pivotally carries a pawl 31. The tooth of the pawl 31 is adapted to fall into the interdental spaces on the rack 11 so as to permit the rod 6 to move in the downward direction but to prevent the rod 6 from moving in the reverse direction. When the pawl 31 is detached from the rack 11, the rod 6 is allowed to move upwardly by the resiliency of the springs 9a, 9b and 9c. An elongate slot 32 is formed axially in the vertical pipe 2'. An operator of this testing machine peeps through the elongate slot 32 and can ascertain how much the rod 6 is pushed down by the steel ball 4.

While a preferred embodiment of the present invention has been disclosed, it is to be understood that it has been described by way of example only and not in a limiting sense and the scope of the present invention is determined by the following claims.

What is claimed is:

1. An apparatus for allowing the impact force of a plurality of falling bodies to cause the rotation of a shaft, said apparatus comprising:
   a main pipe vertically positioned,
   an inclined pipe branched downwardly from the middle portion of said main pipe,
   a communicating passage interconnecting the lower end of said inclined pipe and the upper end of said main pipe,
   a plurality of steel balls having a diameter smaller than the inside diameter of said main pipe and said inclined pipe and passing through said main pipe, said inclined pipe and said communicating passage,
   a conveyor accommodated in said communicating passage and adapted to carry said steel balls from the lower end of said inclined pipe to the upper end of said main pipe,
   a rod with a head disposed in said main pipe coaxially therewith,
   a means for biasing said rod upwardly,
   a pinion meshed with a rack on the lower portion of said rod,
   a shaft disposed through said pinion coaxially therewith, and
   a means for transmitting the rotation of said pinion to said shaft only when said rod moves downwardly.

2. An apparatus as set forth in claim 1, wherein said means for biasing said rod upwardly comprises:
   three springs connected in series and fitting over said rod,
   the upper end of the upper one of said three springs engaging against the under surface of said head of said rod, the lower end of the lower one of said three springs engaging around the rod near the upper end of said rack, the middle one of said three springs having a larger spring constant than said upper one, and said lower one having a still larger spring constant than said middle one.

3. An apparatus as set forth in claim 2, further comprising:
   an upper base upon which the main pipe is vertically erected; and
   a lower base provided beneath said upper base.

4. An apparatus as set forth in claim 1, wherein said means for transmitting the rotation of said pinion to said shaft comprises:
   a driving clutch member formed integrally with said pinion for rotation therewith and for limited axial movement along said shaft,
   a plurality of bearings provided around said shaft for said rotation,
   a driven clutch member firmly secured to one end portion of said shaft,
   wherein the engaging surfaces of said driving clutch member and said driven clutch member are shaped so as to permit them to engage with each other when said pinion is rotated by the downward axial movement of said rod and so as to permit them to ride over each other when said pinion is rotated by the upward axial movement of said rod,
   a collar means, firmly secured to the other end portion of said shaft, for retaining said pinion and said driving clutch member between said collar and said driven clutch member, and
   a spring positioned about said shaft with one end in abutment with said collar means and with the other end seated in abutment with one of said plurality of bearings.

5. An apparatus as set forth in claim 4, further comprising:
   an upper base upon which the main pipe is vertically erected; and
   a lower base provided beneath said upper base.

* * * * *